United States Patent [19]

Leadbetter

[11] Patent Number: 4,972,018
[45] Date of Patent: Nov. 20, 1990

[54] LATEX BASED ADHESIVE COMPOSITION CONTAINING AMMONIUM ZIRCONIUM CARBONATE FOR THE ENHANCEMENT OF HOT, GREEN BOND ADHESIVE PROPERTIES OF PAPERBOARD AND CORRUGATED BOARD

[75] Inventor: Arthur N. Leadbetter, Midland, Mich.

[73] Assignee: The Dow Chemical Company, Midland, Mich.

[21] Appl. No.: 286,393

[22] Filed: Dec. 19, 1988

Related U.S. Application Data

[63] Continuation-in-part of Ser. No. 7,223, Jan. 27, 1988, Pat. No. 4,812,496.

[51] Int. Cl.$^5$ .................... C08L 3/00; C09J 101/00
[52] U.S. Cl. .................................. 524/47; 524/52; 524/280; 524/801; 156/328; 156/330.9; 156/336

[58] Field of Search ............ 524/47, 52, 801, 280; 156/328, 330.9, 336

[56] References Cited

U.S. PATENT DOCUMENTS 4,812,496  3/1989  Leadbetter et al. .................. 524/47

FOREIGN PATENT DOCUMENTS 49-4541   2/1974  Japan ................................. 524/280
63-20377  1/1988  Japan ................................. 524/280

*Primary Examiner*—Nathan M. Nutter

[57] ABSTRACT

An adhesive of starch, an ammonium-based latex and ammonium zirconium carbonate improves the hot, green bond properties of the adhesive formulation for paperboard and corrugated board. The latexes are typical styrene-butadiene and carboxylated styrene-butadiene latexes but untypically are polymerized in the presence of a volatile base such as ammonium hydroxide.

7 Claims, No Drawings

LATEX BASED ADHESIVE COMPOSITION CONTAINING AMMONIUM ZIRCONIUM CARBONATE FOR THE ENHANCEMENT OF HOT, GREEN BOND ADHESIVE PROPERTIES OF PAPERBOARD AND CORRUGATED BOARD

CROSS-REFERENCE TO RELATED APPLICATION

This application is a Continuation-in-Part of the copending application Ser. No. 007,223, filed Jan. 27, 1988 and now U.S. Pat. No. 4,817,496.

BACKGROUND OF THE INVENTION

Starch-based adhesives have been extensively employed for various adhesive applications, especially in the area of paperboard and corrugated board. Generally, starch-based adhesives for corrugation are formulated from cooked or gelatinized starch and raw starch particles. The cooked starch increases viscosity and serves as a suspending agent for the raw starch particle. Heating the starch mixture results in gelation of the uncooked starch yielding higher viscosity and improved bonding characteristics.

A major consideration in the preparation of starch-based adhesives is the ultimate adhesive strength. One measurement of adhesive strength is pin strength. Pin strength is the force (measured in pounds) required to delaminate a liner board from the medium in a corrugated board construction.

A further consideration with respect to pin strength is more particularly wet-pin strength. Wet-pin strength is the pin strength of a corrugated board construction after having been soaked in water. Where wet strength is important it is necessary for adhesives to have excellent adhesion under high humidity and wet conditions. It is also important that this excellent water-resistance be achieved under minimal cure conditions. Conventional starch-based adhesives generally have poor water-resistance, therefore it is desirable to prepare an adhesive for paperboard and corrugated board having improved water-resistance.

SUMMARY OF THE INVENTION

The present invention is an aqueous adhesive comprising starch and an ammonium-based latex. Preferably, the adhesive is prepared in the absence of a caustic component, such as sodium hydroxide.

Utilizing an ammonium-based latex improves the water-resistance of the adhesive and therefore, improves the wet-pin strength of the corrugated board.

An enhancement of the hot, green bond adhesive properties of the adhesive formulation can be achieved through the addition of ammonium zirconium carbonate to the formulation.

DETAILED DESCRIPTION OF THE INVENTION

The aqueous adhesive of the present invention comprises an ammonia-based latex and starch.

The starch component of the adhesive is generally present in an amount of from about 20 to about 95 dry parts, based on 100 parts of dry adhesive. More preferably, the starch is present in an amount of from about 40 to about 90 dry parts per 100 parts of dry adhesive. Generally 1 to 10 parts of the starch component is cooked or gelatinized to provide for viscosity in the final adhesive. Alternatively, synthetic thickeners can be used to develop the required initial adhesive viscosity eliminating the need to cook any of the starch.

In the preparation of the example adhesive, a minor portion of the starch is cooked by first blending with water and heating until dissolved. This primary mixture can then be added to a secondary mixture containing the latex and remaining starch component. The two mixtures are then thoroughly mixed to prepare the subject adhesive.

The latex component of the subject adhesive, which is generally added to the uncooked portion of the composition, is generally present in an amount of from about 80 to about 5 dry parts per 100 parts dry adhesive; more preferably, from about 50 to about 10 dry parts per 100 parts dry adhesive. From an economic standpoint, it is more desirable to maintain the latex at as low a level as possible.

By "ammonia-based latex" is meant a polymer latex prepared in the presence of ammonium hydroxide. Normally a non-volatile base, such as sodium hydroxide, is used as a neutralent (to raise pH) during polymerization. However, for the latex used in the present latex based adhesive, a volatile base such as ammonium hydroxide acts as the polymerization neutralent.

Typical latex polymer compositions which can be employed in the subject latex based adhesive are those generally known in the art and polymerized in the presence of a volatile base such as ammonium hydroxide. Typical examples of latex polymers which can be employed in adhesives of the present invention are styrene-butadiene latexes and carboxylated styrene-butadiene latexes similar to those disclosed in U.S. Pat. No. 4,396,453, the difference being that present latexes are ammonium hydroxide based rather than sodium hydroxide based.

Employing modified styrene-butadiene latex polymers such as isopropenyl oxazoline-modified styrene-butadiene latex in the subject adhesive composition yields improved water-resistant characteristics as well. The oxazoline-modified polymer compositions are generally disclosed in U.S. Pat. Nos. 4,508,869 and 4,474,923, herein incorporated by reference. These oxazoline-modified polymers are disclosed to have good tensile and elongation properties and excellent resistance to water and aqueous fluids. These properties are enhanced when the latex is polymerized in the presence of ammonium hydroxide. An enhancement of the hot, green bond adhesive properties of the adhesive formulation can be achieved through the addition of ammonium zirconium carbonate to the formulation.

The functional monomer, isopropenyl oxazoline, is typically present in the latex polymer, in an amount from about 0.25 to about 10 parts per 100 parts by weight polymer latex, more preferably from about 1 to about 2 parts per 100 parts polymer latex.

In the preparation and testing of various latex based adhesive formulations employing the starch and the ammonium-based latex, it has been found that by minimizing the amount of caustic component, such as sodium hydroxide, employed in the preparation of the latex based adhesive that wet-pin strength is substantially improved. Thus, the preferred latex based adhesive of the present invention comprises only a minor amount of caustic component, more preferably no caustic component.

The addition of ammonium zirconium carbonate to the adhesive formulation can significantly enhance the hot, green bond strength of the adhesive bond. The additive expressed as $ZrO_2$, to the adhesive formulation is typically present in an amount of from about 0.1 to about 10 parts per 100 parts of latex solids in the adhesive. The preferred amount of ammonium zirconium carbonate in the formulation is from about 0.5 to about 5.0 parts per 100 parts of latex solids in the adhesive. Should the additive create instability in the adhesive, the pH of the adhesive formulation can be raised to approximately 9 to correct the problem. Ammonium hydroxide is preferred for the adjustment of the pH.

The latex based adhesive composition of the present invention can be utilized in the production of corrugated paperboard and corrugated paperboard products such as containers. The corrugated paperboard typically comprises a fluted medium and a liner adhesively joined to the tips of the fluted medium on one or both sides thereof. (The adhesive made from the present latex is not limited to the above-described corrugated paperboard but can be used for other corrugated board construction as well.) The adhesive composition of the present invention can be applied to the fluted medium or the liner, however it is usually preferred to apply the adhesive to the tips of the fluted medium.

The adhesive can be employed in amounts from about 1 to about 10 pounds per 1,000 square feet based upon the dry weight or solids weight of the adhesive. Preferably, the adhesive is employed in amounts of from about 1 to about 5 pounds per 1,000 square feet.

Any of various paperboard substrates can be utilized in combination with the present adhesive composition in order to provide corrugated paperboard having improved wet-pin strength. The latex based adhesive of the present invention also provides water-resistant properties. The present composition can be employed in a variety of paperboard products including wax or resin impregnated paperboards, which would further improve the water-resistant characteristic of a corrugated paperboard product prepared with the present invention.

EXAMPLE 1

Into a one-gallon, jacketed reactor equipped with lab pumps to deliver monomer and aqueous feeds are added 1088.05 g of deionized water, 14.77 g of a one-percent active aqueous pentasodium diethylene triamine pentacetate solution, 29.53 g of itaconic acid and 26.18 g of a 39.7 percent solids seed latex containing polystyrene particles having a volume average particle size of about 270Å. The reactor is purged with nitrogen and heated to 90° C. Then, over a two hour and 40 minute period is added a monomer stream containing 590.63 g of styrene and 5.17 g of tertiary dodecyl mercaptan.

Beginning simultaneously with the start of the monomer stream is added a second monomer stream, also over a two hour and 40 minute period, 355.0 g of butadiene.

Beginning simultaneously with the start of each of the above monomer streams is added continuously over a five hour period, 295.3 g of deionized water, 16.41 g of a 45 percent active aqueous surfactant solution, 14.77 g of a 10 percent aqueous ammonium hydroxide solution, and 10.34 g of sodium persulfate. After three hours and for five minutes is added 78.55 g of a 10 percent ammonium hydroxide solution. After three hours and 10 minutes for one hour and 20 minutes is added another monomer stream containing 2.21 g of tertiary dodecyl mercaptan, 14.77 g of isopropylene oxazoline, 302.7 g of styrene and 184.0 g of butadiene. Following the addition of the monomer streams and aqueous streams, the reaction mixture is maintained at 90° C. for one additional hour and then cooled.

Adhesive Compound Preparation

A mixer is charged with 400 pounds of cold water. Forty-five pounds of corn starch are added and the mixture is agitated until the corn starch is dispersed. The mixture is then heated to 85° C. and held at 85° C. for 15 minutes with mixing to gelatinize the starch. Fifty pounds of cold water are then added to cool the mixture.

In a separate mixer, 2,000 pounds of 50 percent solids latex prepared similarly to the latex in Example 1, are added. In another smaller container, 10 pounds of 10 mol. borax are dissolved with agitation in 70 pounds of water, heated to 60° C. The solubilized borax/water mixture is added, with agitation, to the latex in the mixer. Then 665 pounds of corn starch are added and the mixture is agitated until all of the corn starch is well dispersed. Thereafter, the mixture of 45 pounds of gelatinized corn starch in 450 pounds of hot water prepared above is added slowly. Mixing is continued until a smooth, homogeneous adhesive is obtained. The resultant adhesive has a viscosity of 2,700 cps, as measured with a Model RVT Brookfield Viscometer at 20 RPMS.

The ammonium zirconium carbonate (AZC), commercially available from Magnesium Elektron Inc., (the preferred stabilized version is designated Bacote 20 ® (a registered trademark of Magnesium Elektron, Inc.) can be added to the formulation prior to mixing, at 3.0 parts, (expressed as $ZrO_2$ based on latex solids) and the pH of the formulation can then be raised to about 9 with a 28 percent solution of ammonium hydroxide. The hot, green bond strength of the AZC modified adhesive is 3.5 pounds per 2 inch width of corrugated board, as measured by a spring scale immediately after removing the sample from a 171° C. hotplate after 6 seconds dwell (designed to simulate commercial corrugation machine speed of 150 meters per minute). The comparative example made from non-AZC modified adhesive produces a 1 pound adhesion when measured similarly to the measurement procedure for the AZC sample. This increase in hot, green bond strength by the addition of AZC, as measured by this procedure, sufficiently simulates the improved runnability on pilot and commercial corrugation equipment as evidenced by fewer hot cutting problems and faster line speeds.

EXAMPLE 2

Into a one-gallon, jacketed reactor equipped with lab pumps to deliver monomer and aqueous feed are added 1160.67 g of deionized water, 0.37 g of a 40 percent active aqueous pentasodium diethylene triamine pentacetate solution, 29.69 g of itaconic acid and 26.12 g of a 40 percent solids seed latex containing polystyrene particles having a volume average particle size of about 270Å. The reactor is purged with nitrogen and heated to 90° C. Then, over a four hour period is added a monomer stream containing 556.60 g of butadiene.

Beginning simultaneously with the start of the butadiene monomer stream is added continuously over a four hour and 30 minute period, a monomer stream containing 897.98 g of styrene and 7.42 g of tertiary dodecyl mercaptan. Also, beginning simultaneously with the start of the monomer streams is added continuously over a four hour and 30 minute period, 296.85 g of deionized water, 30.83 g of a 33.7 percent solution of sodium persulfate, 5.30 g of a 28 percent solution of ammonium hydroxide and 15.49 g of a 45 percent active aqueous surfactant solution. Following addition of the monomer and aqueous streams, the reaction mixture is maintained at 90° C. for one additional hour and then cooled.

The latex/starch adhesive is then prepared as described above. The boxboard is then tested for wet-pin adhesion by soaking a 2 X 4 inch strip of boxboard in water for one hour, mounting the boxboard on an Instron machine and recording the force required to reach delamination.

The wet-pin adhesion, as is shown in the following table, improves when the latex in the adhesive is ammonium hydroxide based rather than sodium hydroxide based. (Comparative Example 2 is prepared similarly to Example 2 but with sodium hydroxide and not ammonium hydroxide.)

| POLYMERIZATION NEUTRALANT VS WET-PIN ADHESION | | |
| --- | --- | --- |
| Adhesive | Neutralant Used in Latex Recipe | Wet-Pin (lbs.) |
| Example 1 (IPO modified) | NH₄OH | 65 |
| Example 2 | NH₄OH | 60 |
| Comparative Example 2 | NaOH | 15 |

The ammonium zirconium carbonate, can be added to the formulation as described in Example 1, and the pH of the formulation can then be raised to about 9 as described in Example 1. The hot, green strength of the formulation is increased from 1 pound per 2 inch width corrugated board for the adhesive without AZC to 3.5 pounds with AZC present when determined and evaluated as discussed above.

What is claimed is:
1. An aqueous adhesive consisting essentially of:
   (a) starch present in an amount of from about 20 to about 95 dry parts per hundred parts dry adhesive: and
   (b) an ammonium-based latex in an amount of from about 80 to about 5 dry parts per hundred parts dry adhesive: and
   (b) ammonium zirconium carbonate present in the aqueous adhesive in an amount of from about 0.1 to about 10 parts (expressed as $ZrO_2$) per 100 parts of latex solids.
2. The adhesive of claim 1 wherein said latex is an isopropenyl-2-oxazoline-modified polymer latex.
3. The adhesive of claim 1 wherein the ammonium-based latex is selected from the group consisting of styrene-butadiene polymer latex or carboxylated styrene-butadiene polymer latex.
4. The adhesive of claim 1 wherein said latex is an isopropenyl-2-oxazoline-modified styrene-butadiene polymer latex.
5. The adhesive of claim 4 wherein said isopropenyl-2-oxazoline is present in an amount of from about 0.25 to about 10 parts by weight based on 100 parts polymer latex.
6. The adhesive of claim 4 wherein said isopropenyl-2-oxazoline is present in an amount of from about 1 to about 2 parts by weight based on 100 parts polymer latex.
7. The adhesive of claim 1 wherein the ammonium zirconium carbonate (expressed as $ZrO_2$) is present in the aqueous adhesive in an amount of from about 0.5 to about 5.0 parts per 100 parts of latex solids.

* * * * *